United States Patent
Kurokawa (10) Patent No.: US 10,873,678 B2
(45) Date of Patent: Dec. 22, 2020

(54) IMAGE INPUT APPARATUS AND CONTROL METHOD OF IMAGE INPUT APPARATUS

(71) Applicant: CANON KABUSHIKI KAISHA, Tokyo (JP)

(72) Inventor: Kuniaki Kurokawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/517,040

(22) Filed: Jul. 19, 2019

(65) Prior Publication Data

US 2020/0045200 A1 Feb. 6, 2020

(30) Foreign Application Priority Data

Aug. 1, 2018 (JP) ................................. 2018-145454

(51) Int. Cl.
*H04N 1/04* (2006.01)
*H04N 1/00* (2006.01)

(52) U.S. Cl.
CPC ........... *H04N 1/04* (2013.01); *H04N 1/00888* (2013.01); *H04N 1/00899* (2013.01); *H04N 2201/0081* (2013.01)

(58) Field of Classification Search
CPC .. H04N 1/04; H04N 1/00888; H04N 1/00899; H04N 2201/0081
USPC ................ 358/497, 494, 474, 412, 413, 409
See application file for complete search history.

(56) References Cited

U.S. PATENT DOCUMENTS

| 6,851,609 B2 * | 2/2005 | Ando | H04N 1/0473 235/454 |
| 8,040,577 B2 * | 10/2011 | Akiyama | H04N 1/047 358/486 |
| 2004/0125416 A1 * | 7/2004 | Gawlik | H04N 1/0473 358/474 |
| 2008/0117481 A1 * | 5/2008 | Akiyama | H04N 1/0473 358/488 |
| 2009/0066988 A1 * | 3/2009 | Imaizumi | H04N 1/2166 358/1.13 |

FOREIGN PATENT DOCUMENTS

JP 2007-201672 8/2007

* cited by examiner

*Primary Examiner* — Cheukfan Lee
(74) *Attorney, Agent, or Firm* — Venable LLP (57) ABSTRACT

In the image input apparatus of the present invention, a control unit included therein performs control so as to stop an image reading unit in a case where an amount of power stored in a power storage unit becomes less than or equal to a first threshold value, performs control so as to charge the power storage unit with a predetermined amount of power, performs control so as to return the reading unit up to a predetermined return position in a direction opposite to an image reading direction, and after returning the image reading unit up to the predetermined return position, performs control so as to move the image reading unit in the reading direction in a case where an amount of power is larger than a second threshold value and otherwise move the image reading unit in the reading direction after charging the power storage unit with the power.

18 Claims, 6 Drawing Sheets

| FIG.2A |
|--------|
| FIG.2B |

IMAGE INPUT APPARATUS AND CONTROL METHOD OF IMAGE INPUT APPARATUS

BACKGROUND OF THE INVENTION

Field of the Invention

The present invention relates to an image input apparatus including a power storage unit and a control method of an image input apparatus.

Description of the Related Art

Conventionally, a flat bed scanner is known which reads a document placed on a document table glass by moving a carriage on which an image sensor, such as a contact image sensor (CIS), is mounted along the document table glass.

Here, Japanese Patent Laid-Open No. 2007-201672 has disclosed a technique to improve throughput until reading is resumed by monitoring the empty capacity of a buffer after suspending the image reading operation and causing the carriage to reach the reading resumption position at the time the buffer enters a state where printing can be resumed.

Incidentally, as the flat bed scanner, there is a so-called bus power compatible flat bed scanner that receives supply of power from an interface, such as USB, and which internally includes a power storage unit, such as an EDLC (Electric Double-Layer Capacitor). In this bus power compatible flat bed scanner, power supplied to the power storage unit from the bus power is stored temporarily and further, by the power from the power storage unit, the carriage is driven by a motor.

In the configuration such as this, in a case where the power necessary to drive the motor of the carriage is larger than the power stored in the power storage unit, there is a case where the power runs short during the image reading operation and in such a case, the carriage is stopped temporarily until the power storage unit is charged with power.

Here, Japanese Patent Laid-Open No. 2007-201672 does not take into consideration the shortage of power in the power storage unit in the operation for reading resumption. That is, there is a possibility that an operation failure due to the shortage of power of the power storage unit occurs in the image input apparatus.

The present invention has been made in view of the above-described conventional problem and an object is to avoid an operation failure due to the shortage of power in an image reading operation in an image input apparatus.

SUMMARY OF THE INVENTION

In order to solve the above-described problem, the image input apparatus of the present invention includes: an image reading unit configured to read an image formed on a document: a power storage unit configured to store power for moving the image reading unit; and a control unit configured to control movement and stop of the image reading unit and an amount of power with which the power storage unit is charged, and the control unit performs control so as to: stop the image reading unit in a case where an amount of power stored in the power storage unit becomes less than or equal to a first threshold value in the image reading; charge the power storage unit with a predetermined amount of power after the stop; return the image reading unit up to a predetermined return position in a direction opposite to the image reading direction after the charge; and move, after returning the image reading unit up to the predetermined return position, the image reading unit from the predetermined return position in the reading direction in a case where an amount of power stored in the power storage unit is larger than a second threshold value and move the image reading unit from the predetermined return position in the reading direction after charging the power storage unit with the power in a case where an amount of power stored in the power storage unit is less than or equal to the second threshold value.

Further features of the present invention will become apparent from the following description of exemplary embodiments with reference to the attached drawings.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention. In addition, a variety of aspects in a scope not deviating from the gist of the present invention are also included in the present invention and it is also possible to appropriately combine parts of the following embodiments.

First Embodiment 1

Figure 1:
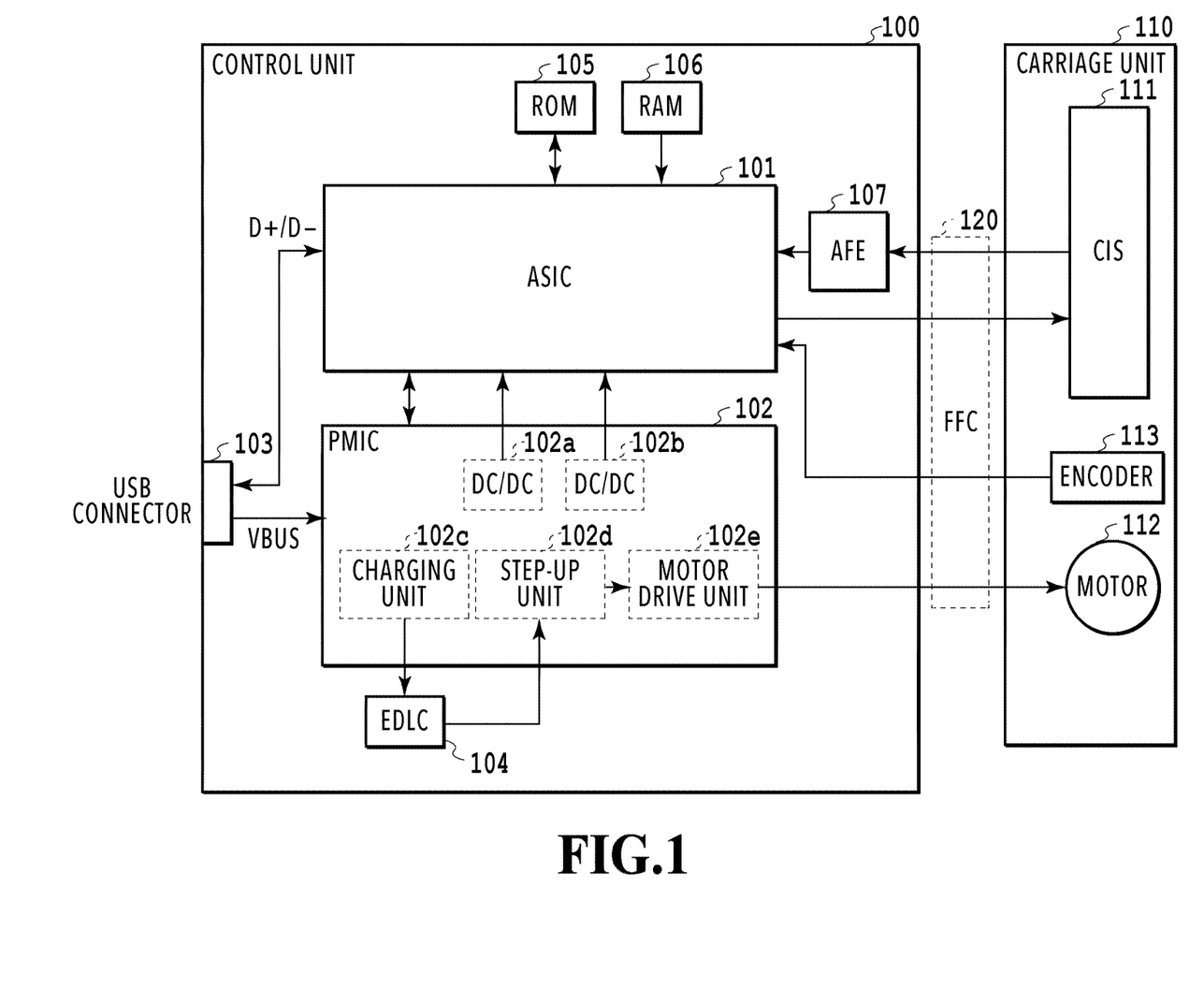
FIG. 1 is an outline block diagram of an image input apparatus.

FIG. 1 is an outline block diagram of an image input apparatus according to the present embodiment. The image input apparatus is a so-called flat bed scanner including a document table on the top surface of the casing. The image input apparatus operates on USB bus power and internally includes an EDLC (Electric Double-Layer Capacitor) 104 as a power storage unit.

The image input apparatus reads an image formed on a document placed on the document table, such as transparent glass, by causing a carriage unit 110 to scan the image and transmits the read image as image data to a host PC (not shown schematically) connected to a USB connector 103.

As shown in FIG. 1, the image input apparatus includes a control unit 100 and the carriage unit 110. The control unit 100 includes an ASIC 101, a PMIC 102, the USB connector 103, the EDLC 104, a ROM 105, a RAM 106, and an AFE 107.

The ASIC (Application Specific Integrated Circuit) 101 is a control IC. The ASIC 101 performs USB (Universal Serial Bus) interface control with the host PC and control of a motor 112 based on a pulse output from an encoder 113 of the carriage unit 110. In addition, the ASIC 101 receives information relating to the amount of charge of the EDLC 104 from the PMIC 102 by performing serial communication with the PMIC 102.

The PMIC (Power Management Integrated Circuit) 102 includes a DC/DC converter 102a, a DC/DC converter 102b, a charging unit 102c, a step-up unit 102d, and a motor drive unit 102e. The DC/DC converter 102a converts USB-bus-supplied power of DC 5V supplied from the host PC via the USB connector 103 into a core voltage of 1.1 V of the ASIC 101. The DC/DC converter 102b converts the USB-bus-supplied power of DC 5V supplied from the host PC via the USB connector 103 into a voltage of 3.3 V for GPIO (General Purpose Input/Output) of the ASIC 101.

The charging unit 102c charges the connected EDLC 104 with the USB-bus-supplied power. The step-up unit 102d steps up the voltage of the power discharged from the EDLC 104 to a voltage (in the present embodiment, 24 V) higher than the USB-bus-supplied 5V in order to drive the motor 112. The motor drive unit 102e drives the motor 112. The USB connector 103 is a connector compatible with the USB standard. The EDLC 104 is a power storage unit as described above, and is an electric double-layer capacitor.

The ROM (Read Only Memory) 105 stores programs for controlling the entire image input apparatus. The RAM (Random Access Memory) 106 stores data obtained by performing image processing for a digital signal output from the AFE (Analog Front End) 107. The RAM 106 also functions as a data transfer buffer. The AFE 107 converts an analog image signal output from a CIS 111 via an FFC (Flexible Flat Cable) 120 into a digital signal.

The carriage unit 110 includes the CIS 111, the motor 112, and the encoder 113. The CIS 111 is an image sensor and has an LED (Light Emitting Diode) as a light source, which is driven by a drive signal from the ASIC 101. The motor 112 is a motor for moving the carriage unit 110 in the sub scanning direction. The encoder 113 outputs a pulse in accordance with the number of revolutions of the motor 112.

Next, with the above configuration in mind, an example of the reading operation of the image input apparatus is explained. The image input apparatus temporarily stores read image data in an internal buffer in the image reading operation and sequentially transfers the image data to the host apparatus, such as a PC, via an interface, such as USB. However, in a case where the buffer becomes full during the image reading operation, the moving operation of the carriage unit 110 is stopped and the reading operation is suspended. Then, in a case where the empty capacity of the buffer becomes less than or equal to a predetermined capacity, the image reading is resumed. In a case where the carriage unit 110 is stopped and the movement of the carriage unit 110 is resumed during the image reading operation, in the deceleration operation section accompanying the stop of the carriage unit 110 and in the acceleration operation section accompanying the resumption of drive, the carriage unit 110 is not moved at a constant speed, and therefore, image reading is not performed. Because of this, after the stop of the carriage unit 110, the image input apparatus once returns the carriage unit 110 in a direction opposite to the reading direction. After this, the image input apparatus moves the carriage unit 110 again in the reading direction and after the carriage unit 110 is moved up to the image reading resumption position, the image reading is resumed.

Figures 2, 2A:
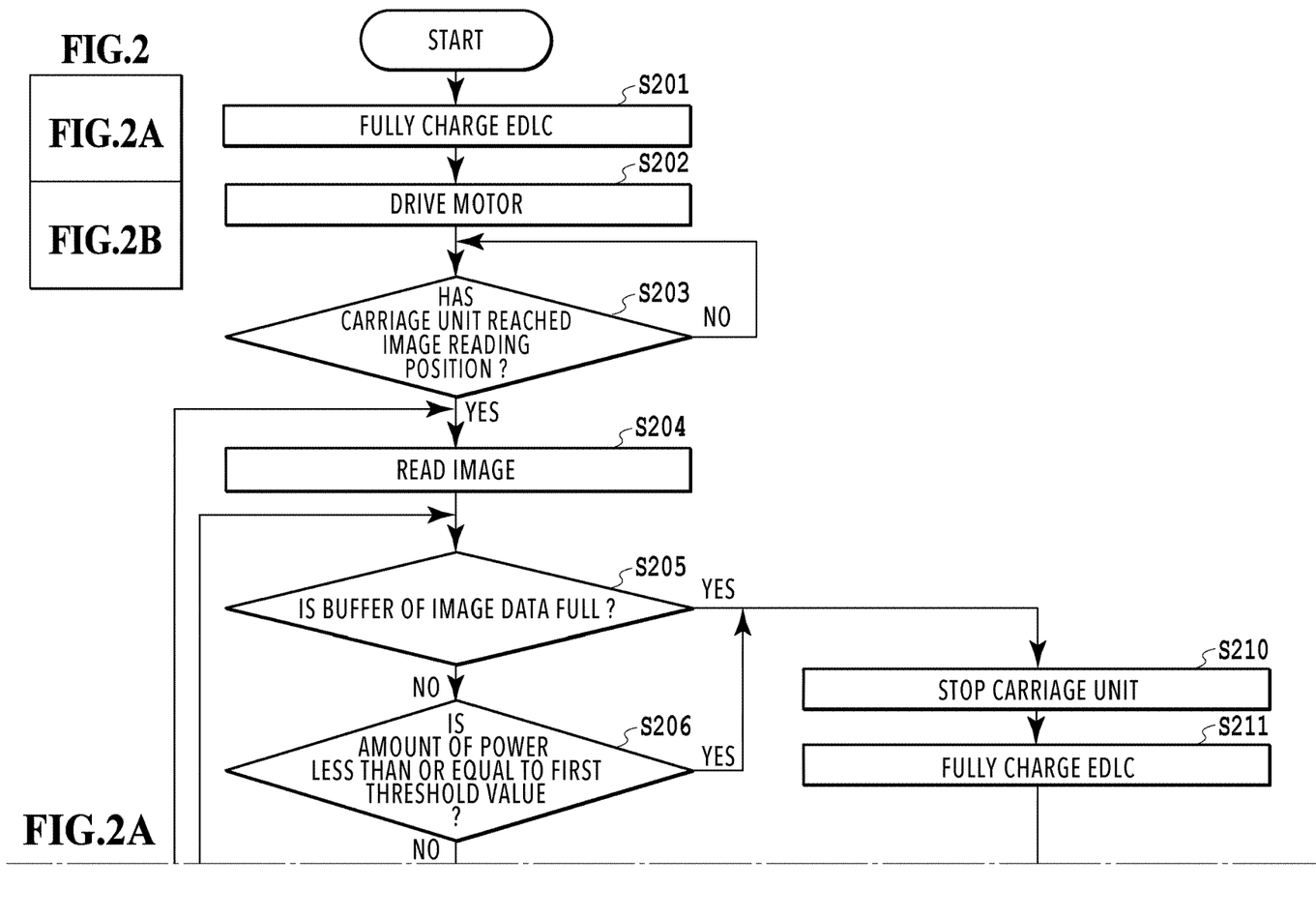
FIG. 2 is a diagram showing the relationship of FIG. 2A and FIG. 2B.
FIG. 2A is a flowchart showing a procedure of processing in the image input apparatus.
Figure 2B:
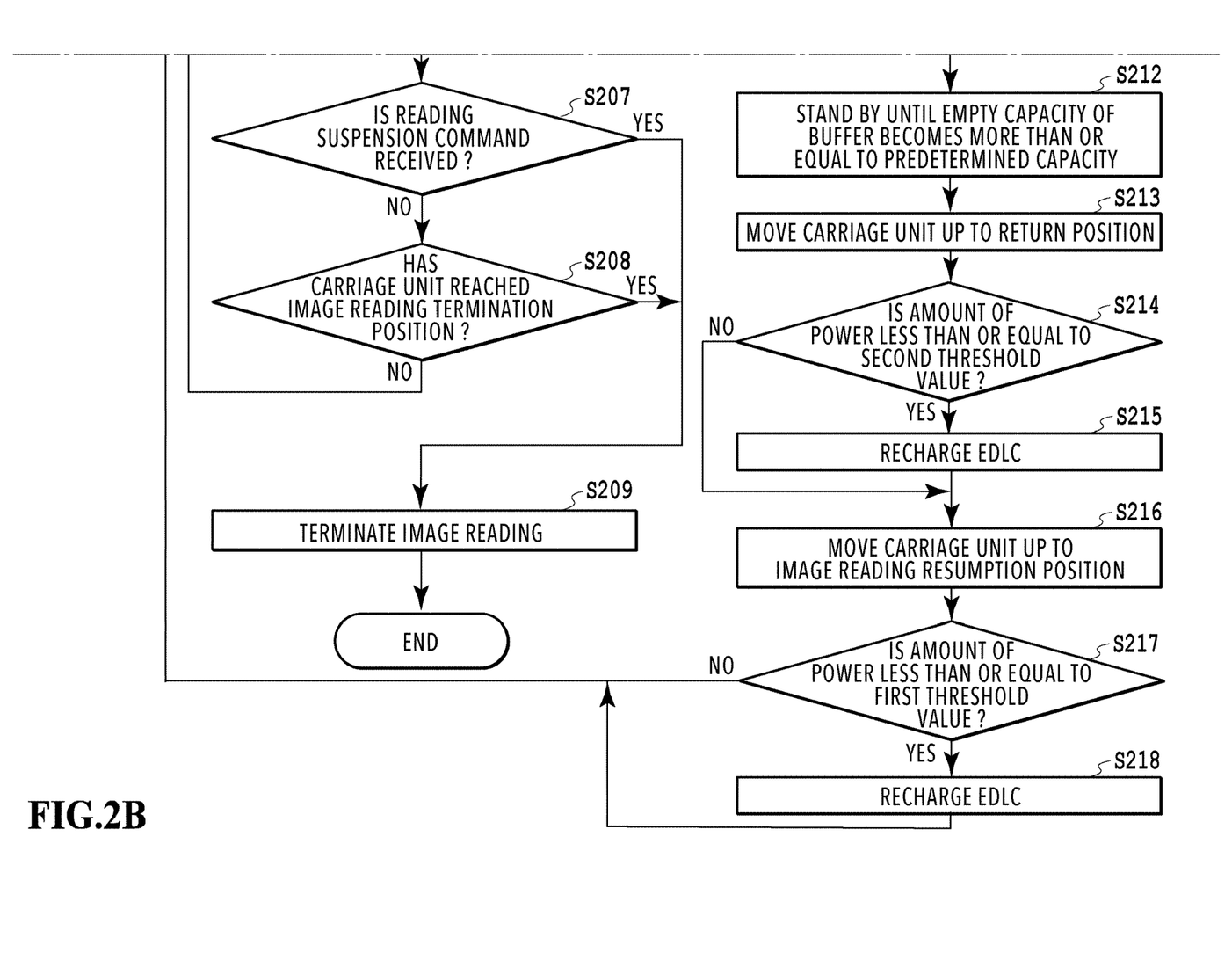
FIG. 2B is a flowchart showing a procedure of processing in the image input apparatus.

Following the above, the procedure of the processing in the image input apparatus is explained by using FIG. 2A and FIG. 2B. In more detail, FIG. 2A and FIG. 2B are flowcharts showing the procedure of the image reading processing performed in the image input apparatus in a case where the image input apparatus receives an image reading command from the host PC. In the following, it is assumed that symbol "S" in explanation of the flowchart indicates a step.

First, at S201, the ASIC 101 instructs the PMIC 102 to fully charge the EDLC 104 and charges the EDLC 104 with power to drive the motor 112 used to move the carriage unit 110, which is started thereafter (stores power in the EDLC 104).

At S202, the ASIC 101 starts the drive of the motor 112 via the motor drive unit 102e. At S203, the ASIC 101 determines whether or not the carriage unit 110 has reached the image reading position by monitoring the pulse signal from the encoder 113.

In a case of determining that the carriage unit 110 has reached the image reading position at S203 (Yes at S203), the ASIC 101 starts image reading at S204. In a case where the image reading is started, at S205, the ASIC 101 sequentially transfers the read image data to the host PC via the USB interface and determines whether or not the buffer of image data in the RAM 106 is full.

Then, in a case of determining that the buffer of image data is not full (No at S205), the ASIC 101 determines whether or not the amount of power held in the EDLC 104 is less than or equal to the amount of power necessary to complete reading of the image. Hereinafter, the amount of power necessary to complete reading of a predetermined unit of the image is referred to as a first threshold value. The predetermined unit corresponds to an image corresponding to a predetermined number of lines, such as an image corresponding to one line and an image corresponding to two lines.

In a case of determining that the amount of power stored in the EDLC 104 is larger than the first threshold value (No at S206), at S207, the ASIC 101 determines whether or not a reading suspension command from the host PC is received. Here, in a case of determining that the reading suspension command from the host PC is not received (No at S207), at S208, the ASIC 101 determines whether or not the carriage unit 110 has reached the image reading termination position from the count value of the pulse output of the encoder 113. Then, in a case of determining that the carriage unit 110 has not reached the image reading termination position (No at S208), the ASIC 101 returns the processing to S205 and continues image reading while repeatedly performing the processing from S205 to S208. In a case of receiving the reading suspension command from the host PC (Yes at S207) or in a case of determining that the carriage unit 110 has reached the image reading termination position (Yes at S208), the ASIC 101 terminates the image reading at S209.

Then, in a case of determining that the amount of power stored in the EDLC 104 is less than or equal to the threshold value (Yes at S206), at S210, the ASIC 101 quickly stops the drive of the motor 112 via the motor drive unit 102e. That is, the ASIC 101 performs control to stop the carriage unit 110. After this, at S211, the ASIC 101 instructs the PMIC 102 to fully charge the EDLC 104. Here, instructions to fully charge the EDLC 104 are given, but it may also be possible to give instructions to charge the EDLC 104 with a predetermined amount of power (that is, an amount of power sufficient for performing image reading). Further, also in a case of determining that the buffer of image data in the RAM 106 is full at S205 (Yes at S205), the ASIC 101 similarly performs the processing at S210 and S211.

Next after the charge of the EDLC 104, at S212, the ASIC 101 stands by until the empty capacity of the buffer becomes more than or equal to a predetermined capacity that is set in advance by data transfer to the host PC. In a case where No is determined at S205 and Yes is determined at S206, S212 may be omitted. After this, at S213, the ASIC 101 drives the motor 112 via the motor drive unit 102e and moves the carriage unit 110 up to a predetermined return position in a direction opposite to the reading direction (S213). In a case where the carriage unit 110 is moved up to the predetermined return position, in order to guarantee the accuracy thereof, the backlash (gap between the tooth faces of the gear) of the gear that drives the motor 112 is taken into consideration.

At S214, the ASIC 101 determines whether or not the amount of power stored in the EDLC 104 is less than or equal to the amount of power necessary to move the carriage unit 110 from the position to which the carriage unit 110 was returned at S213 up to the image reading resumption position in the reading direction. Hereinafter, the amount of power necessary to complete reading of the image after moving the carriage unit 110 up to the image reading resumption position is referred to as a second threshold value. Then, in a case of determining that the amount of power for driving the motor 112 in the EDLC 104 is larger than the second threshold value (No at S214), at S216, the ASIC 101 moves the carriage unit 110 up to the image reading resumption position.

The ASIC 101 moves the carriage unit 110 and at a position immediately before the image reading resumption position, determines again whether or not the amount of power stored in the EDLC 104 is less than or equal to the above-described first threshold value (S217). Here, the position immediately before the image reading resumption position is the position in the vicinity of the image reading start position in a direction opposite to the reading direction, at which it is possible to perform charge so as to enable the carriage unit 110 to perform a scan at a constant speed from the image reading start position in a case where an image is read. Then, in a case of determining that the amount of power stored in the EDLC 104 is larger than the first threshold value (No at S217), the ASIC 101 resumes image reading.

In a case of determining that the amount of power stored in the EDLC 104 is less than or equal to the second threshold value at S214, at S215, the ASIC 101 performs recharge until the amount of power necessary for movement up to the image reading resumption position is reached. Further, in a case of determining that the amount of power stored in the EDLC 104 is less than or equal to the first threshold value at S217, at S218, the ASIC 101 performs recharge until the amount of power necessary to complete reading of the image is reached. For example, the ASIC 101 performs recharge until the amount of power necessary to read an image corresponding to a predetermined number of lines is reached.

Figure 3:
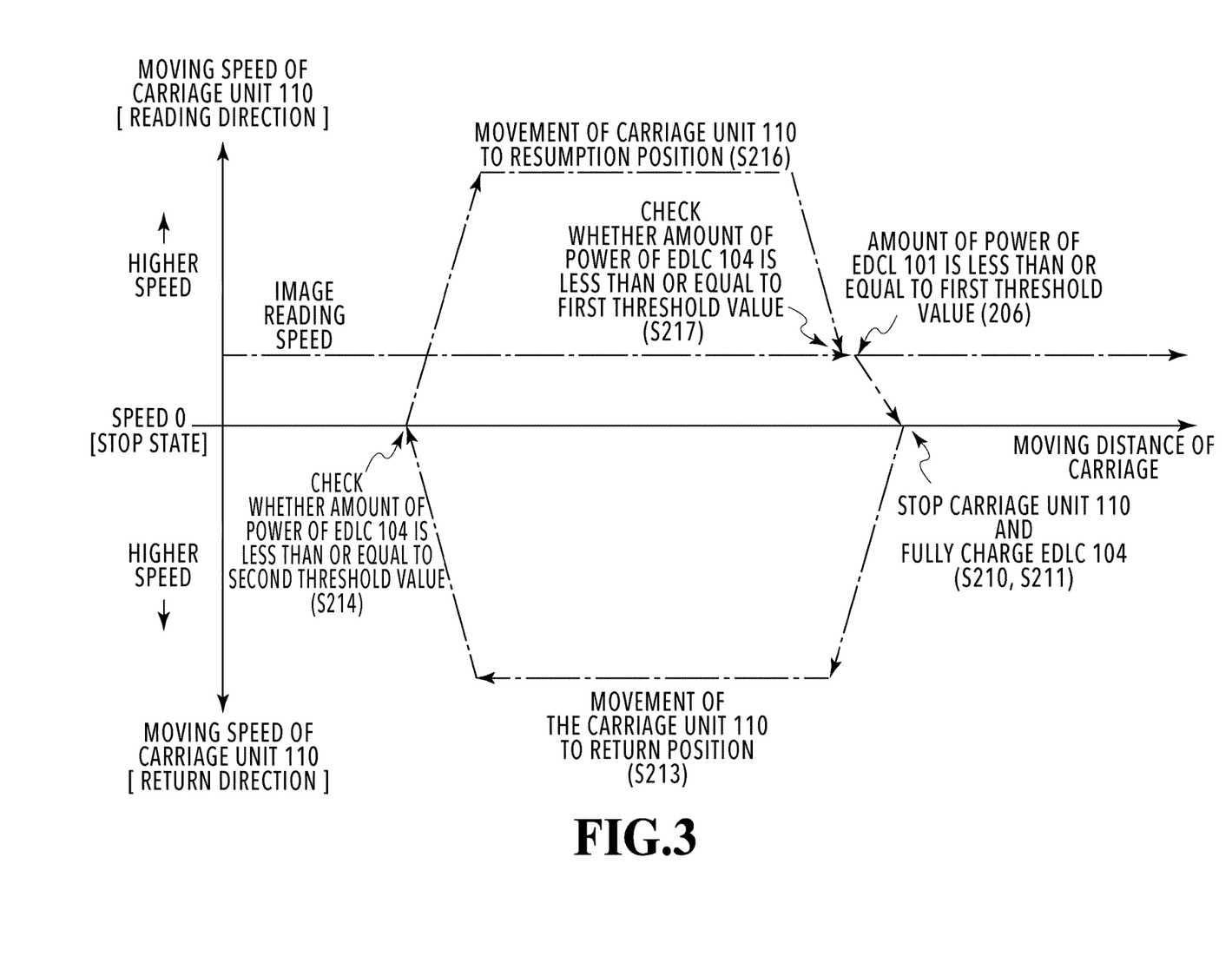
FIG. 3 is a diagram showing a relationship between a carriage moving speed and a distance of the image input apparatus.

Next, by using FIG. 3, supplementary explanation is given to a relationship between the moving speed and the distance of the carriage unit 110 of the image input apparatus. In a case of determining that the amount of power of the EDLC 104 is less than or equal to the first threshold value (Yes at S206), the ASIC 101 reduces the moving speed of the carriage unit 110, stops the carriage unit 110 at S210, and fully charges the EDLC 104 at S211. After this, the ASIC 101 increases the moving speed of the carriage unit 110 in order to move the carriage unit 110 in a direction opposite to the reading direction. At S213, the ASIC 101 moves the carriage unit 110 up to the predetermined return position in a direction opposite to the reading direction and stops the carriage unit 110 at the predetermined return position. Then, at S214, the ASIC 101 determines whether or not the amount of power of the EDLC 104 is less than or equal to the second threshold value. Then, in a case of determining that the amount of power of the EDLC 104 is larger than the second threshold value, the ASIC 101 starts moving the carriage unit 110 in the reading direction and at S216, moves the carriage unit 110 up to the image reading resumption position.

The control to move the carriage unit 110 to the predetermined return position at S213 is not accompanied by image reading, and therefore, it is not necessary to move the carriage unit 110 at the same speed as the image reading speed. In the present embodiment, the speed at which the carriage unit 110 is moved is set to a speed higher than the image reading speed so that power stored in the EDLC 104 is not consumed, but it may also be possible to set the speed so that the power efficiency of the motor 112 becomes high. An example of a speed at which power efficiency is high is a speed higher than the image reading speed and slower than the moving speed of the carriage unit 110 at the time of pre-scan. The pre-scan is scan processing performed before acquiring scanned image data based on the reading setting set by a user. For example, by the pre-scan, home position detection of the carriage unit 110, document size detection, and the like are performed. This is also true with the speed at which the carriage unit 110 is moved to the image reading resumption position at S216.

As described above, by setting the speed at which the carriage unit 110 is moved to a speed at which power efficiency is high, it is possible to reduce the power consumption in the EDLC 104. Further, by reducing the power consumption in the EDLC 104, recharge in the EDLC 104 is no longer necessary or it is made possible to reduce the charge time and as a result of this, it is possible to improve throughput of the image reading operation.

As above, the present embodiment can solve such a problem that it is not possible to move the carriage unit 110 up to the reading resumption position for performing the determination processing at S214 before performing S216.

Second Embodiment

Next, a second embodiment is explained. The block configuration of an image input apparatus according to the second embodiment is the same as the block configuration of the image input apparatus according to the first embodiment, and therefore, explanation thereof is omitted here. In the following, by using FIG. 4A and FIG. 4B, the procedure of processing in the image input apparatus according to the second embodiment is explained by mainly focusing attention on differences from the procedure of the processing in the image input apparatus according to the first embodiment.

Figures 4, 4A:
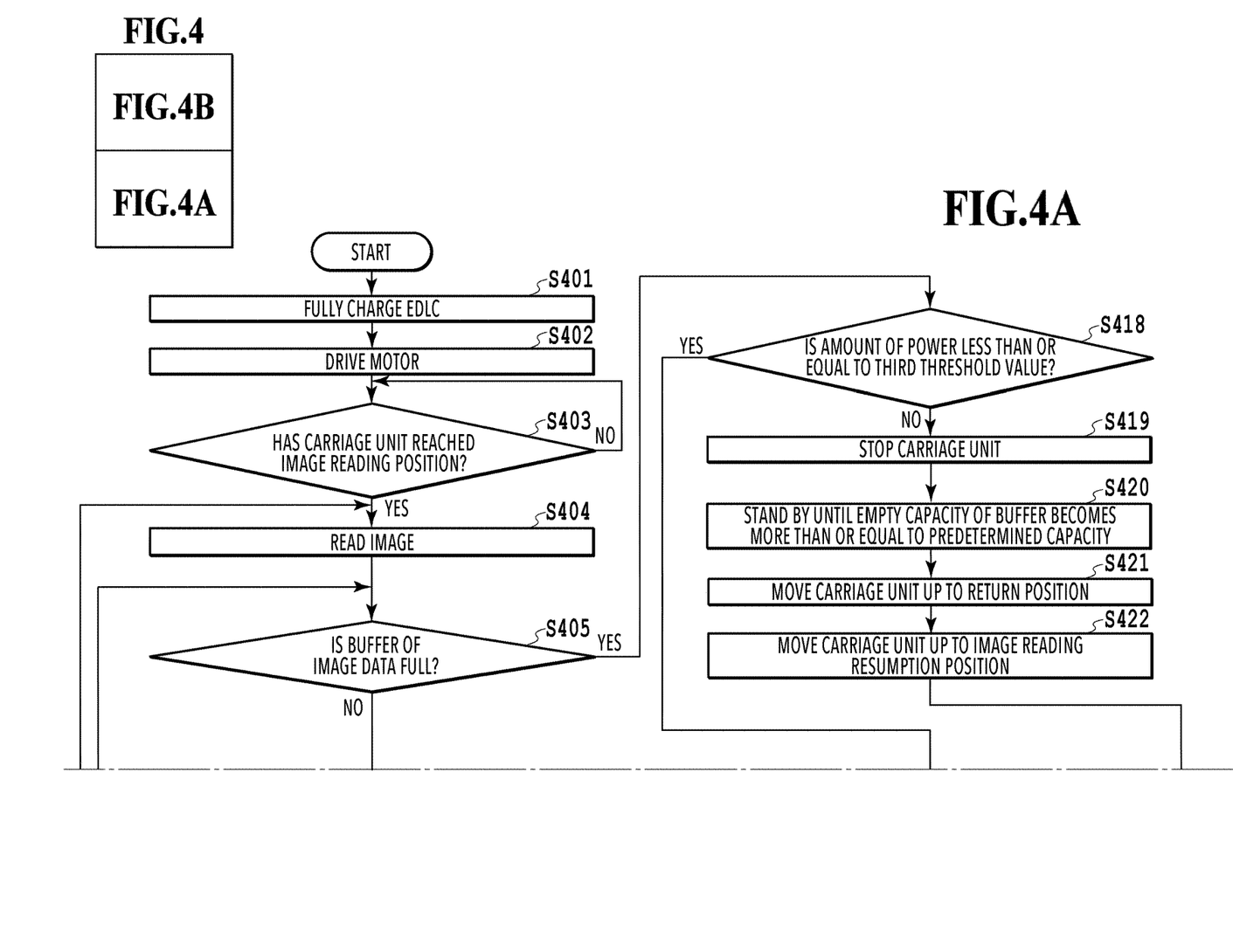
FIG. 4 is a diagram showing the relationship of FIG. 4A and FIG. 4B.
FIG. 4A is a flowchart showing a procedure of processing in the image input apparatus.
Figure 4B:
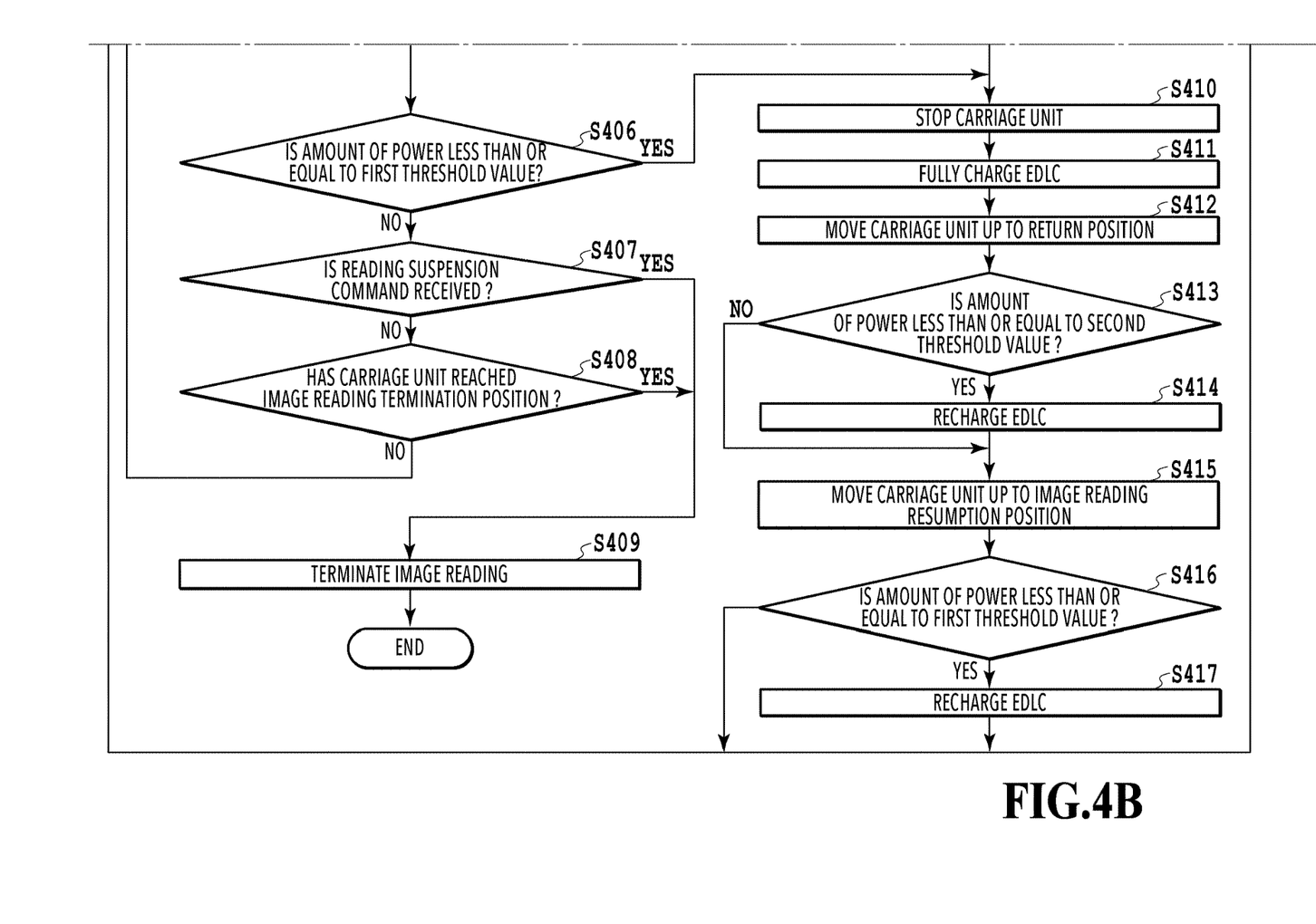
FIG. 4B is a flowchart showing a procedure of processing in the image input apparatus.

FIG. 4A and FIG. 4B are, in more detail, flowcharts showing a procedure of image reading processing performed in the image input apparatus in a case where an image reading command is received from the host PC. The processing at S401 to S404 is substantially the same as the processing at S201 to S204, and therefore, detailed explanation is omitted.

In a case of determining that the buffer of image data is full (Yes at S405), at S418, the ASIC 101 determines whether or not the amount of power stored in the EDLC 104 is less than or equal to the amount of power sufficient to perform the subsequent processing. Here, the amount of power sufficient to perform the subsequent processing refers to the amount of power necessary to move the carriage unit 110 from the stop of the carriage unit 110 at S419 up to the image reading resumption position of the carriage unit 110 at S422, and hereinafter, is referred to as a third threshold value.

Then, in a case of determining that the amount of power stored in the EDLC 104 is larger than the third threshold value (No at S418), at S419, the ASIC 101 stops the carriage unit 110. After the stop of the carriage unit 110, at S420, the ASIC 101 stands by until the empty capacity of the buffer becomes more or equal to a predetermined capacity that is set in advance by data transfer to the host PC.

In a case where the empty capacity of the buffer becomes more or equal to the predetermined capacity that is set in advance, at S421, the ASIC 101 drives the motor 112 via the motor drive unit 102e and moves the carriage unit 110 up to the predetermined return position in a direction opposite to the reading direction. Further, at S422, the ASIC 101 moves the carriage unit 110 up to the image reading resumption position.

As described above, in a case where the carriage unit 110 is stopped because the buffer becomes full and the amount of power stored in the EDLC 104 is larger than the third threshold value, the carriage unit 110 is moved in advance up to the image reading resumption position. Due to this, it is possible to quickly shift the state into the state where the image reading operation can be resumed without performing the processing to determine the amount of power for driving the motor 112 in the EDLC 104. That is, it is possible to reduce the number of times of determination of the amount of power stored in the EDLC smaller than the number of times in a case where Yes is determined at S406, and therefore, it is possible to improve throughput of the image reading operation.

As explained above, in the image reading operation in the image input apparatus, it is possible to avoid an operation failure due to a shortage of power. In more detail, in a case where the carriage unit is stopped and then moved up to the image reading resumption position, the amount of power in the EDLC is monitored and by controlling charge as needed, a situation is avoided in which it is not possible to return the carriage unit up to the image reading resumption position due to a shortage of power.

Further, in a case where the remaining amount of the EDLC, based on which image reading should be suspended, is determined, it is not necessary to take into consideration the power for both the movement up to the predetermined return position after the stop of the carriage unit and the movement up to the image reading resumption position. Because of this, in the image reading operation itself, it is possible to efficiently use the power in the EDLC. Due to this, it is possible to reduce the number of times of stop of the carriage unit (that is, number of times of suspension of image reading) resulting from a shortage of power in the EDLC, and therefore, it is possible to reduce the image reading time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to avoid an operation failure due to a shortage of power in an image reading operation in an image input apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145454, filed Aug. 1, 2018, which is hereby incorporated by reference wherein in its entirety.

What is claimed is:
1. An image input apparatus comprising:
an image reading unit configured to read an image formed on a document:
a power storage unit configured to store power for moving the image reading unit; and
a control unit configured to control movement and stop of the image reading unit and an amount of power with which the power storage unit is charged, wherein
the control unit performs control so as to:
stop the image reading unit in a case where an amount of power stored in the power storage unit becomes less than or equal to a first threshold value in the image reading;
charge the power storage unit with a predetermined amount of power after the stop;
return the image reading unit up to a predetermined return position in a direction opposite to the image reading direction after the charge; and
move, after returning the image reading unit up to the predetermined return position, the image reading unit from the predetermined return position in the reading direction in a case where an amount of power stored in the power storage unit is larger than a second threshold value and move the image reading unit from the predetermined return position in the reading direction after charging the power storage unit with the power in a case where an amount of power stored in the power storage unit is less than or equal to the second threshold value.

2. The image input apparatus according to claim 1, wherein
the control unit moves the image reading unit in the reading direction and performs, in a case where an amount of power stored in the power storage unit is less than or equal to the first threshold value at a position immediately before a reading resumption position, control so as to charge the power storage unit with the power.

3. The image input apparatus according to claim 2, further comprising:
a buffer temporarily storing image data output from the image reading unit, wherein
the control unit performs control so as to:
stop the image reading unit in a case where a capacity of image data stored in the buffer is full and an amount of power stored in the power storage unit is larger than a third threshold value in the image reading; and
move the image reading unit in the reading direction after returning the image reading unit up to the predetermined return position and resume the image reading from the reading resumption position in a case where an empty capacity of the buffer becomes more than or equal to a predetermined capacity after the stop.

4. The image input apparatus according to claim 1, wherein
at least one of a speed at which the image reading unit is returned up to the predetermined return position and a speed at which the image reading unit is moved from the predetermined return position in the reading direction is different from a speed at which the image reading unit is moved in the image reading.

5. The image input apparatus according to claim 4, wherein
at least one of a speed at which the image reading unit is returned up to the predetermined return position and a speed at which the image reading unit is moved from the predetermined return position in the reading direction is set to a speed at which power efficiency is high.

6. The image input apparatus according to claim 1, wherein
the power storage unit is an EDLC (Electric Double-Layer Capacitor).

7. The image input apparatus according to claim 1, wherein
the control unit performs control so as to charge the power storage unit with power supplied from bus power supplied from a USB (Universal Serial Bus) connector.

8. The image input apparatus according to claim 1, wherein
the image reading unit has a motor for moving the image reading unit and
at the predetermined return position, a backlash of a gear driving the motor is taken into consideration.

9. The image input apparatus according to claim 1, wherein
the image input apparatus is a flat bed scanner.

10. A control method of an image input apparatus comprising an image reading unit configured to read an image formed on a document and a power storage unit configured to store power for moving the image reading unit, the control method comprising:
a stop control step of performing control so as to stop the image reading unit in a case where an amount of power stored in the power storage unit becomes less than or equal to a first threshold value in the image reading;
a charge control step of performing control so as to charge the power storage unit with a predetermined amount of power after the stop;
a return control step of performing control so as to return the image reading unit up to a predetermined return position in a direction opposite to the image reading direction after the charge; and
a movement control step of performing control so as to move, after returning the image reading unit up to the predetermined return position, the image reading unit from the predetermined return position in the reading direction in a case where an amount of power stored in the power storage unit is larger than a second threshold value and move the image reading unit from the predetermined return position in the reading direction after charging the power storage unit with the power in a case where an amount of power stored in the power storage unit is less than or equal to the second threshold value.

11. The control method of an image input apparatus according to claim 10, wherein
at the movement control step, the image reading unit is moved in the reading direction and in a case where an amount of power stored in the power storage unit is less than or equal to the first threshold value at a position immediately before a reading resumption position, control is performed so as to charge the power storage unit with the power.

12. The control method of an image input apparatus according to claim 11, wherein
the image input apparatus further comprises a buffer temporarily storing image data output from the image reading unit and the control method further comprises:
a stop control step of performing control so as to stop the image reading unit in a case where a capacity of image data stored in the buffer is full and an amount of power stored in the power storage unit is larger than a third threshold value in the image reading; and
a resumption control step of performing control so as to move the image reading unit in the reading direction after returning the image reading unit up to the predetermined return position and resume the image reading from the reading resumption position in a case where an empty capacity of the buffer becomes more than or equal to a predetermined capacity after the stop.

13. The control method of an image input apparatus according to claim 10, wherein
at least one of a speed at which the image reading unit is returned up to the predetermined return position at the return control step and a speed at which the image reading unit is moved from the predetermined return position in the reading direction at the movement control step is different from a speed at which the image reading unit is moved in the image reading.

14. The control method of an image input apparatus according to claim 13, wherein
at least one of a speed at which the image reading unit is returned up to the predetermined return position at the return control step and a speed at which the image reading unit is moved from the predetermined return position in the reading direction at the movement control step is set to a speed at which power efficiency is high.

15. The control method of an image input apparatus according to claim 10, wherein
the power storage unit is an EDLC (Electric Double-Layer Capacitor).

16. The control method of an image input apparatus according to claim 10, wherein
the power storage unit is charged with power supplied from bus power supplied from a USB (Universal Serial Bus) connector.

17. The control method of an image input apparatus according to claim 10, wherein
the image reading unit has a motor for moving the image reading unit and
at the predetermined return position, a backlash of a gear driving the motor is taken into consideration.

18. The control method of an image input apparatus according to claim 10, wherein
the image input apparatus is a flat bed scanner.

* * * * *